July 28, 1953 W. H. GEDDES ET AL 2,646,620
METHOD OF JOINING TOGETHER THE ENDS OF THIN-WALLED
ALUMINUM HEAT EXCHANGE TUBES
Filed April 14, 1947

Inventors
Walter H. Geddes
Gunnar G. Karlson
Mathew Werensky
By
J E Deringer
Their Attorney Patented July 28, 1953

2,646,620

UNITED STATES PATENT OFFICE 2,646,620

METHOD OF JOINING TOGETHER THE ENDS OF THIN-WALLED ALUMINUM HEAT EXCHANGE TUBES

Walter H. Geddes, Dayton, Gunnar G. Karlson, Miamisburg, and Matthew Werensky, Dayton, Ohio, assignors to United Aircraft Products, Inc., Dayton, Ohio, a corporation of Ohio Application April 14, 1947, Serial No. 741,186

5 Claims. (Cl. 29—360)

This invention relates to the bonding together of aluminum and its alloys, particularly thin walled heat exchange tubes or the like of those metals.

The invention has special, although not limited, application to the fabrication of aircraft oil coolers characterized by a core of thin walled tubes having expanded ends in contact with one another whereby oil may flow around the tubes, between the ends thereof, and a coolant such as air may pass through the tubes. The creation of a leak-proof bond between the expanded ends of the tubes is necessary and this is ordinarily accomplished by a mechanical connection, in some instances formed by soldering and in others brazing. In the case of brass and copper constructed oil coolers, this operation may be carried out in the presence of well known fluxes and by dipping in a soft solder comprised of substantially equal portions of lead and tin. Aluminum does not lend itself readily to bonding by this process. One reason is that conventional fluxes contain materials which are excessively corrosive when in contact with aluminum so that the generation of unsolderable compounds on the surface is so rapid that no wetting takes place between the molten solder and the aluminum. Further, should a bond actually be established electro-chemical action occurs between the aluminum and the solder materials to the detriment of the aluminum and the bond will separate in a relatively short time. This action is greatly accelerated in salt atmospheres where oil coolers frequently are used.

Accordingly, a variety of techniques have been developed for the fabrication of aluminum oil coolers, all having as their basis a brazing process carried on at a temperature somewhat below the melting point of the aluminum, but substantially higher than the temperature at which full annealing occurs. So far as we are aware all such methods, as well as all previous attempts at soldering, have been productive of inconsistent results when applied to conventional oil cooler constructions wherein the expanded tube ends interfit with one another.

It is the primary object of this invention to enable production of an aluminum oil cooler or like device which duplicates the conventional brass and copper oil cooler in exact detail in assembly, mode of operation and in the structure of the constituent parts. Apparent advantages of manufacturing economy are so gained.

Another object is to produce an aluminum oil cooler through use of a bonding material which does not materially affect or change the physical character of the metals used.

A further object is to modify the brazing processes heretofore used in the bonding of aluminum by the addition or substitution of a soldering step whereby the method of fabrication becomes one combining features of brazing and soldering.

Still another object is to permit the soldering of thin walled aluminum structures by so preparing and conditioning the structures that only a very short duration of immersion in the solder bath is necessary to create a good bond between the parts.

A still further object is to obtain a solder composition and a method of preparing such solder, of particular value in the bonding of aluminum.

In carrying out these objects a method has been evolved herein the parts are assembled and one end of the assembly dipped into liquid flux, then dried in a circulating air oven, following which the assembly is suspended over a molten solder bath, causing the temperature of the flux to rise to the point of fusion, whereupon the fluxed end is dipped in the solder and after the determined period of immersion withdrawn and cooled—the foregoing steps being then repeated with respect to the other or opposite end of the assembly. Concerning the solder composition, a method of condition a commercially available composition of tin and zinc has been developed including the step of adding to the basic composition a small proportion of fluxed aluminum which it has been discovered results in the elimination of surface drossing, in the presence of which uniform soldering cannot be accomplished.

Other objects and features of the invention will appear from the following description, which may be more easily followed and understood by reference to the accompanying drawings, wherein.

Figure 1:
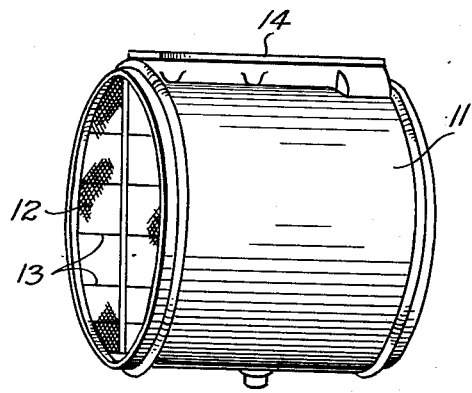
Figure 1 is a view perspective of an oil cooler core assembly fabricated in accordance with the present invention.

As shown in Figure 1, an oil cooler fabricated in accordance with the present invention may be of the class comprising a cylindrical casing or shell 11 within which is a plurality of heat exchange tubes 12 having expanded polygonal ends adapted to interfit one with another to form closed reticulated surfaces at the opposite ends of the tube bundle. Intermediate their expanded ends the tubes 12 are spaced apart from one another and provide passages for the flow of oil therebetween. There may be further disposed within the tube bundle spaced baffle plates 13 constructed and arranged to compel a circuitous flow of the oil through the passages provided by the heat exchange tubes 12. The oil cooler is arranged or disposed in a path of flowing air which passes longitudinally through the tubes 12 in heat exchange relation with the oil surrounding the tubes and acts as a coolant.

The shell 11 is formed with inlet and outlet openings for the oil and these are preferably arranged on one side of the shell, a fitting 14 being superimposed on such openings and serving as a mounting for a valve mechanism (not shown) for controlling the flow of oil to and from the passages of the heat exchange portion of the cooler.

According to the present invention, the shell 11, tubes 12, baffles 13 and fitting 14 all may be formed of aluminum or aluminum alloy. In assembling and fabricating an oil cooler, in accordance with this invention, the fitting 14 is attached to the shell 11 by any conventional brazing or like technique. Thereafter, a core of prestacked tubes 12 and baffles 13 is inserted in the shell. The aluminum alloy parts should be chemically clean and to this end may be dipped in a caustic soda and in nitric acid prior to assembly. The manner of assembly consists in stacking the tubes and baffles into a core and inserting the unbonded core into the shell and fitting assembly to which the core tubes will be attached by solder.

Following assembly, one end of the assembly comprising the core and surrounding shell 11 is dipped in a flux suspended in alcohol. The flux may be a commercially available type adapted for aluminum working operations and comprises zinc chloride, sodium fluoride, sodium bromide and other compounds capable of dissolving aluminum oxide coating and also of alloying with aluminum to a small extent. In dipping the core end into the flux the depth is not critical although the assembly probably should be immersed to a depth equal to the length of the expanded ends of the tubes. The alcohol is drawn up between the hexagonal faces of the tubes and between the corners where the hexes join together by capillary action, taking with it small particles of flux. A similar flow takes place along the inside surface of the shell 11 where the expanded ends of the tubes 12 are in contact with it.

After withdrawal of the oil cooler core end from the flux, the assembly is dried, preferably in a circulating air oven. Sufficient drying time is allowed to drive off all the alcohol leaving a coating of dry flux on all the surfaces to be soldered.

Without allowing the fluxed end of the assembly appreciably to cool, a step of preheating then is taken wherein the dry flux is raised to a temperature value representing its fusion point. This may be done in an oven or furnace but special equipment for preheating may be obviated and better results obtained by suspending the fluxed assembly a short distance above the molten solder bath immediately following its removal from the drying oven.

Figure 2:
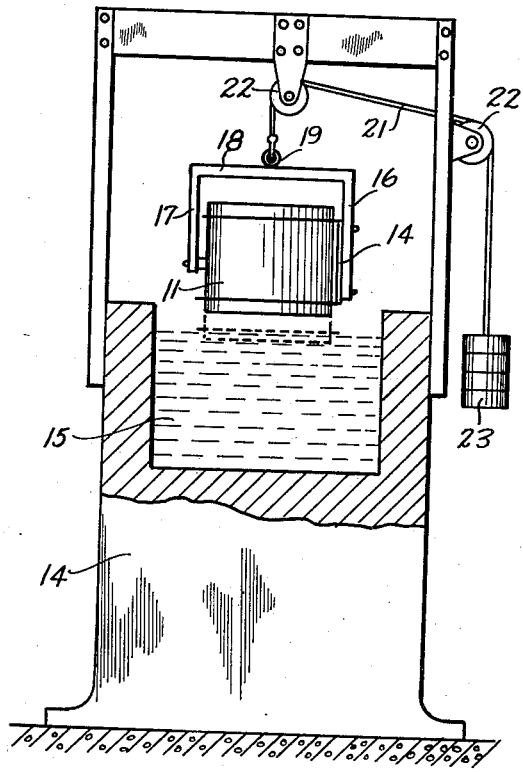
Figure 2 is a diagrammatic view of an installation for facilitating dipping of the core assembly in molten solder.

An apparatus by which the assembly may be suspended above the solder bath and dipped is diagrammatically indicated in Fig. 2. The solder container is indicated at 14 and the molten solder therein at 15. A temporary block 16 and a plate 17 are attached to opposite sides of the shell 11 and provide connections for a yoke 18. The yoke 18 has a hook 19 for attachment to one end of a chain 21. The chain 21 is passed over pulleys 22 and extends downward for manipulation by the hand of the operator. Weights 23 are provided for balancing the assembly in any selected position of adjustment. The oil cooler core assembly is suspended with the fluxed end downward and is lowered until the fluxed face is a short distance above the level of the solder 15. The solder bath is maintained at a temperature of about 150° to 200° above the liquidous temperature of the solder. The suspended core assembly and the flux thereon accordingly increase in temperature. The exact temperature at which the flux fuses it is not necessary to know precisely, but is probably about 550° F. At any rate the establishment of proper temperature is visually evidenced by a smoking or liquefying of the flux. At the moment fusing of the flux is observed, the operator actuates chain 21 to lower the fluxed end into the solder bath. The depth of immersion may correspond to the length of the expanded ends of the tubes 12, but preferably is somewhat less to permit good capillary rise and to prevent flooding. The duration of immersion probably should not exceed 10 seconds. Good results have been obtained between a range of 4-10 seconds, although small diameter tube bundles have been satisfactorily bonded with a solder dip no longer than one second. There is some variation in dipping time according to the diameter of the assembly. Slight local cooling occurs when the bundle of tubes is immersed in the solder and the transfer of heat from the main body of molten solder into the area into which the assembly is dipped must take place in order to regain the lost heat and also to raise the temperature of the core tubes. If the duration of immersion is too long, greater or lesser amounts of the core tubes may be dissolved in the solder bath due to the affinity of molten solder for the aluminum. Contributing causes in permitting an immersion in the solder of so short a length are the cleaning of the parts and the drying and preheating of the flux, earlier described steps of the method. These aid in that a more perfect bond may be obtained due to the fact that it is not necessary to vaporize and drive off relatively large volumes of alcohol by heat from the molten solder and to remove excessive amounts of oxide from the surfaces to be joined. These earlier steps have so prepared the assembly that a much quicker and more uniform wetting and soldering action is obtained. This action takes place substantially simultaneously throughout the entire assembly as a result of the preconditioning.

Figure 3:
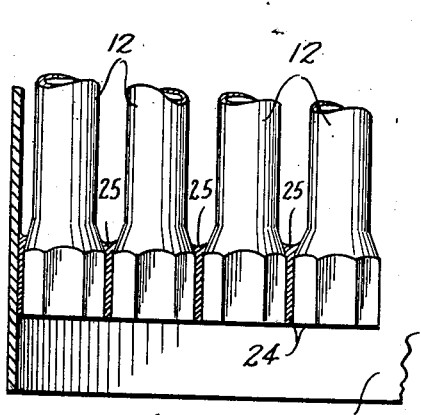
Figure 3 is a fragmentary view of a section of an oil cooler core showing the bond established between the parts by the method of the present invention.

Within the solder bath, the solder flows between the expanded tube ends, and between the tube ends and the shell 11 and establishes a continuous web 24 of solder material across the face of the core effectively bonding the parts together and sealing that end of the core. As shown in Fig. 3, the solder flows also to the space in back of the tube ends. Then as the assembly is lifted from the bath, the excess solder drains from the assembly leaving a concave fillet 25 in the space in back of adjacent tube ends.

Upon withdrawal of the core assembly from the solder, the temperature of the assembly is reduced, cooling preferably being accomplished by air drafts.

Following cooling, the other or opposite end of the core assembly is fluxed, as before described, and the foregoing steps repeated with respect to that end.

When both ends have been subjected to the soldering operation, the assembly thoroughly is washed to remove flux residue. Washing can be accomplished by circulating hot water through the assembly for a time long enough to dissolve and carry off the flux residues. After washing, the surfaces of the aluminum alloy may be treated to neutralize any flux not removed in washing and also to improve the corrosion resistance of the aluminum alloy. As a final step, the core assembly is dried by any suitable means, for example in an oven at a temperature of about 250° F.

The solder alloy selected for use in this method is composed primarily of tin and zinc. A composition of 60% tin and 40% zinc has been used with satisfactory results, but this composition may be varied at least up to 75% tin and 25% zinc. It further has been found, however, that this tin and zinc composition is productive in itself of an undesirable drossing on the surface of the solder bath, the dross apparently being formed by oxidation of the zinc. At the temperature at which soldering is carried out, according to the present invention, the dross forms so rapidly that it is impossible to remove it by skimming. It was discovered that through the addition of a small amount of aluminum to the solder bath, drossing could be completely eliminated. Accordingly, the basic tin-zinc composition of the solder is modified through the addition of aluminum in a proportion on the order of ½ of 1%. An advantageous manner of adding the aluminum is to melt in the molten bath thin sections of aluminum coated with the same flux used in the soldering operation. This is best accomplished by melting the tin-zinc alloy and holding it at a temperature not to exceed 650° F. until substantially all of the aluminum has been added. Thorough dispersion of the aluminum within the solder bath is insured by mechanical agitation during a period of 48 to 72 hours, during which period the temperature of the solder bath gradually is raised to a value on the order of 850° F. The operating temperature of the solder may be varied between about 650° to 850° according to the diameter of the core assembly being dipped. The relatively greater degree of heat transfer occasioned by the dipping of large diameter assemblies makes it advisable to increase the solder temperature in direct proportion to increasing assembly diameter.

Fluxing of the aluminum before immersion in the solder bath is done so that intimate contact of the aluminum by the molten solder and its ready dissolution may occur. Fluxing further permits the absorption of the aluminum into the solder at a lower bath temperature than would be possible without fluxing.

In practicing the above described method we have successfully used the following specific embodiment thereof.

Following assembly of the parts, one end of the assembly is dipped in the liquid flux, which is at room temperature, to a depth slightly greater than the length of the expanded ends of the tubes. Upon withdrawal from the flux, the assembly is placed in a circulating air oven and the flux dried. In drying, a temperature of about 300° F. is held for fifteen to twenty minutes and then during the next fifteen to twenty minutes the oven temperature is gradually raised to about 425° F. Since it is advisable to obtain as rapid drying of the flux as possible without scoltering thereof or generating premature flux reaction, two ovens may be used for drying—one held at a temperature of about 300° F. and the other at a temperature of about 425° F. The core assembly then may be quickly transferred from the oven of lower temperature to the one of higher temperature, and the time of drying thereby materially reduced. Immediately following the drying step, the assembly is placed in the yoke 18 and suspended over the solder bath, being lowered so that the fluxed end is one-quarter to one-half inch above the level of the solder. So suspended, and subject to the heat of the solder bath, the core assembly and the flux thereon gradually rise in temperature. The condition of the flux is under continuous observation by the operator and when fusing begins, as evidenced by smoking and liquefaction, the assembly is further lowered to immerse the fluxed end thereof in the solder. The depth of immersion is approximately one-half the length of the expanded ends of the tubes, the solder being drawn up by capillary action the remaining distance between the tube ends and into the space in back of the tube ends. The duration of immersion is about six seconds, at which time the assembly is withdrawn from the solder bath and cooled by forcing air at room temperature therethrough. After cooling, the opposite end of the assembly is dipped in the flux and the foregoing steps repeated following which the assembly is washed and dried as before described.

What is claimed is:

1. The method of joining together the expanded ends of thin walled aluminum heat exchange tubes to form an oil cooler core or the like; comprising the steps of dipping one end of an assembled core into a flux suspended in alcohol, particles of flux being drawn up between the expanded tube ends by capillary action; heating the fluxed end to drive off the alcohol and leave a dry flux; suspending the core assembly over a bath of molten solder, the fluxed core end being immediately above the surface of the solder; allowing said core assembly to remain so suspended until the flux begins visibly to fuse and then dipping the fluxed end into the molten solder; withdrawing and cooling said fluxed end after a period of immersion in the solder not exceeding 10 seconds; and then repeating the foregoing steps with respect to the other or opposite core end.

2. The method of joining together the expanded ends of thin walled aluminum heat exchange tubes to form an oil cooler or the like; comprising the steps of dipping one end of an assembled core into a flux suspended in alcohol, particles of flux being drawn up between the tube ends by capillary action; heating the fluxed end in a circulating air oven to a temperature of about 400° F. until the alcohol is driven off and the flux is dry; suspending the core assembly over a bath of molten solder held at a temperature of about 150° to 200° F. above its liquidous temperature, the fluxed end being immediately above the surface of the solder; allowing the core assembly to remain so suspended until its temperature rises to a value at which visible fusing of the flux takes place and then immersing the fluxed end in the solder bath; and withdrawing said fluxed end from the solder after a period of immersion not exceeding 10 seconds.

3. The method of fabricating an aluminum oil cooler or the like made up of a plurality of heat exchange tubes having expanded ends in contact with one another, said tubes being surrounded by a casing or shell, comprising the steps of assembling the tubes within the shell; dipping one end of the assembly comprising the tubes and shell into a flux, preheating said fluxed end to the fusing temperature of the flux by suspending the assembly with the fluxed end immediately above a bath of molten solder, immersing the fluxed end into the solder when the flux thereon begins visibly to fuse, and withdrawing said fluxed end from the solder after a period of immersion not exceeding ten seconds.

4. The method of claim 3, characterized by the further steps of cooling the assembly, and then repeating the foregoing steps with respect to the other or opposite end of the assembly.

5. The method of joining together the expanded ends of thin-walled aluminum heat exchange tubes to form an oil cooler or the like; comprising the steps of applying to one end of an assembled core and between the expanded ends of the core tubes a flux, preheating said fluxed end in a first stage in a circulating air oven wherein the temperature is raised to a value on the order of 400° F., and in a second stage wherein the core assembly is suspended above a bath of molten solder with the fluxed end immediately above the level of the solder, said solder both being held at a temperature of about 150° to 200° F. above its liquids temperature, and dipping the fluxed end into said solder bath concomitantly with fusing of the flux thereon for a period of time not exceeding 10 seconds.

WALTER H. GEDDES.
GUNNAR G. KARLSON.
MATTHEW WERENSKY.

References Cited in the file of this patent

UNITED STATES PATENTS

| Number | Name | Date |
| --- | --- | --- |
| 572,200 | Hammond | Dec. 1, 1896 |
| 1,326,971 | Salm | Jan. 6, 1920 |
| 1,342,703 | Wright et al. | June 8, 1920 |
| 2,417,662 | Rosales | Mar. 18, 1947 |
| 2,443,574 | Burns | June 15, 1948 |
| 2,443,577 | Finlay | June 15, 1948 |

OTHER REFERENCES

Iron Age, July 11, 1946, pp. 54, 55, and 56.

Circular of the Bureau of Standards, No. 78 (table 1, line 6), issued Jan. 28, 1919, by Dept. of Commerce, Washington, D. C.

Welding and Brazing alcoa Aluminum, 1944 (page 101, paragraphs 2 and 3), Aluminum Company of America, Pittsburgh, Pa.